Jan. 2, 1968   W. C. SWANSON ETAL   3,360,933
HYDROSTATIC SYSTEM CHARGING AND BY-PASS VALVE MEANS
Filed May 2, 1966   5 Sheets-Sheet 1

Inventors:
William C. Swanson
John S. Lam
Donald W. Moyer
By Walter G. Gregory
Atty

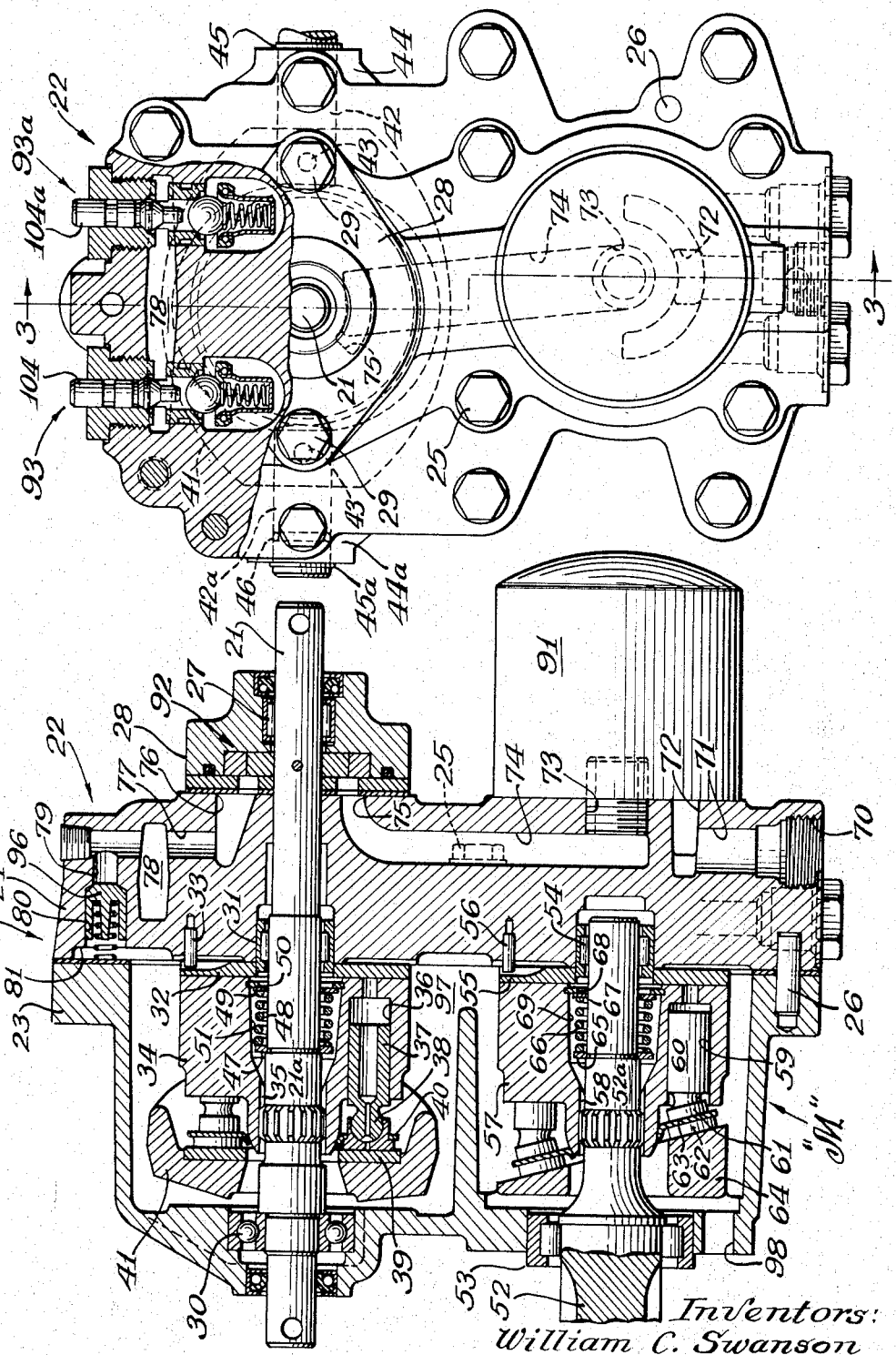

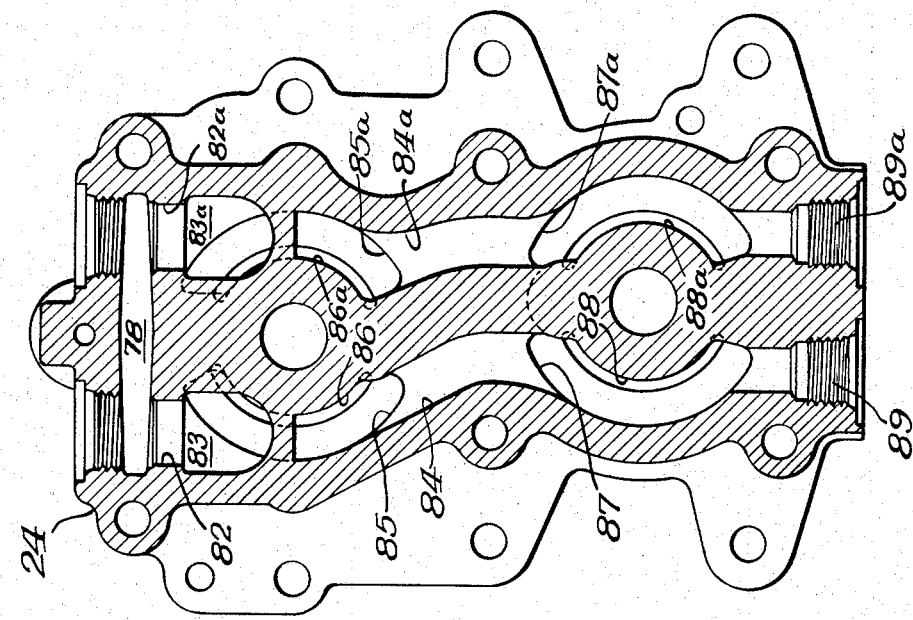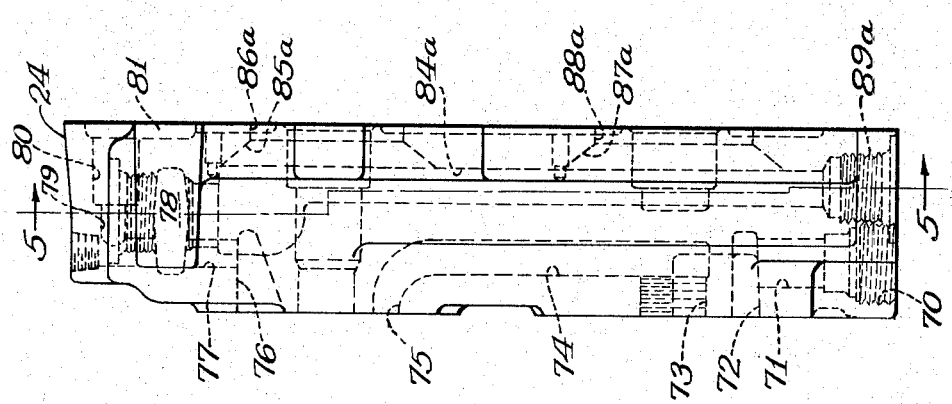

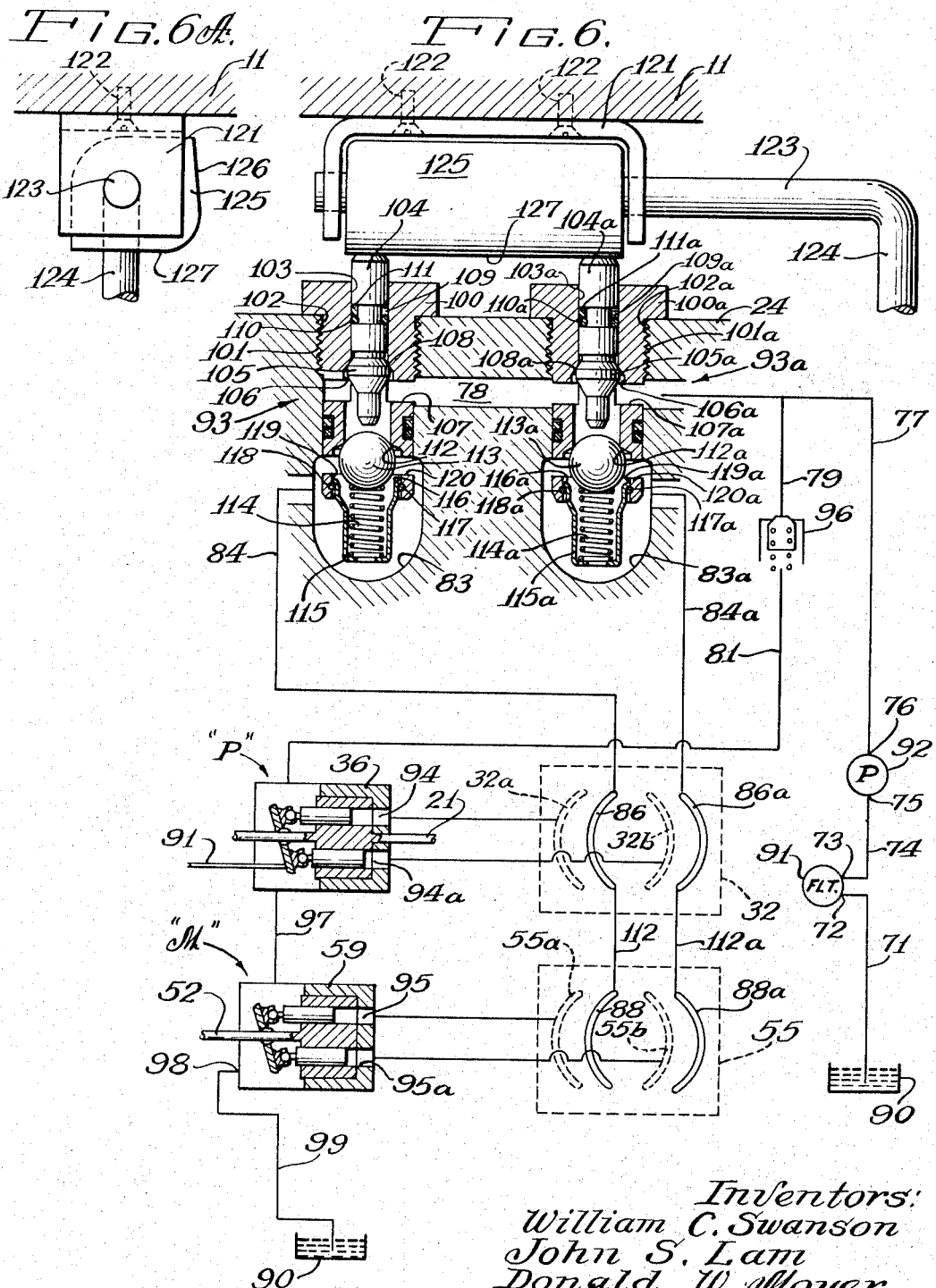

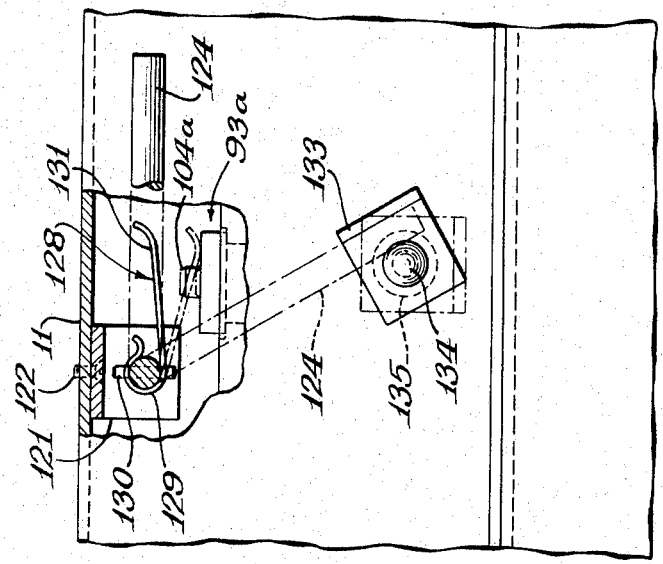
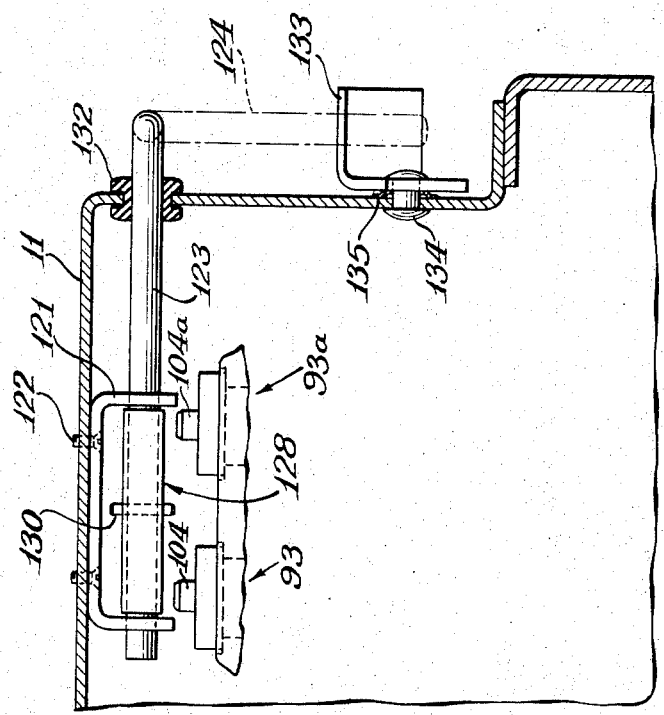

though the present invention is shown and will be described as incorporated in a tractor vehicle, it is to be clearly understood that such showing and description is exemplary only and that the invention may equally well be incorporated in other vehicles or in stationary installations as well.

United States Patent Office
3,360,933
Patented Jan. 2, 1968

3,360,933
HYDROSTATIC SYSTEM CHARGING AND BY-PASS VALVE MEANS
William C. Swanson and John S. Lam, Clarendon Hills, and Donald W. Moyer, Downers Grove, Ill., assignors to International Harvester Company, Chicago, Ill., a corporation of Delaware
Filed May 2, 1966, Ser. No. 546,983
10 Claims. (Cl. 60—53)

This invention relates to hydrostatic transmissions, but more particularly it is concerned with the provision of valving means for hydraulic system charging and by-pass purposes.

Heretofore it has been known to provide valving means interconnectable between opposite sides of the hydrostatic loop in a hydrostatic transmission to facilitate a charging of the system. It was also known to interconnect valving means therebetween for purposes of by-passing fluid between opposite sides of said loop. Such units as have heretofore been proposed have not been altogether acceptable either because they were too complicated and expensive to fabricate or were not readily controllable, or because they were not capable of performing the dual function of serving both as charging valves and as by-pass or dump valves.

The primary object of the present invention, therefore, is to provide a novel combination hydrostatic transmission system charging and by-pass valve means.

Another object is to provide mechanically controllable valving means communicatively interconnected between the input and output lines of the hydrostatic loop extending between the pump and motor of a hydrostatic transmission unit and operable in one position to permit charging the system and in another position to permit by-pass of fluid between opposite sides of said loop to thereby provide a free-wheeling condition for the traction wheels of a vehicle in which said transmission is incorporated.

A further object is to provide in a hydrostatic transmission improved valving means interconnectable between opposite sides of the hydrostatic loop thereof and a system fluid charge pump and arranged so that normally said valving means is maintained closed but automatically opens to permit the admission of charging fluid therethrough selectively to opposite sides of said loop when the pressure within a respective side of said loop falls below that of the charge pump fluid, and having externally operable mechanism for opening said valving means to permit by-pass of fluid between opposite sides of said loop.

A still further object is to provide improved combination by-pass and system fluid charging valve means including means normally automatically operative for permitting either side of a hydrostatic transmission loop to be charged with fluid and including additional means mechanically operative for overriding the normal position of said combination valving means whereby fluid is by-passed between opposite sides of the associated hydrostatic loop.

A yet still further object is to provide improved mechanical means operative for opening valving means interconnected between opposite sides of a hydraulic transmission loop to effect a by-pass of fluid therebetween.

An important object is to provide a pair of check valves interconnectable between opposite sides of a hydrostatic transmission loop and a charging fluid pump and normally operative for automatically controlling the admission of charging fluid to said loop but including mechanical means externally operative for opening said valves to permit the by-pass of fluid between opposite sides of said loop.

The foregoing and other objects and features of the invention will become apparent as the disclosure is more fully made in the following detailed description of a preferred embodiment of the invention as illustrated in the accompanying sheets of drawings in which:

FIGURE 2 is an end elevational view of a hydrostatic transmission unit with a portion thereof in section to show disposition of the valving means of the proposed invention;

FIGURE 3 is a vertical sectional view taken generally along the line 3—3 of FIGURE 2;

FIGURE 4 is a side elevational view of a cover plate component of the hydrostatic transmission;

FIGURE 5 is a vertical sectional view taken generally along the line 5—5 of FIGURE 4;

FIGURE 6 is a generally schematic representation but with portions thereof shown in cross-section of the hydraulic circuit for a hydrostatic transmission incorporating the present invention therein;

FIGURE 6a is a fragmentary end elevational view showing a camming component utilized for operating the proposed valving means;

FIGURE 7 is a elevational view of a modified form of mechanism for actuating the proposed valving means; and FIGURE 8 is an end elevational view with a portion thereof shown cut-away of the mechanism shown in the preceding figure.

Figure 1:
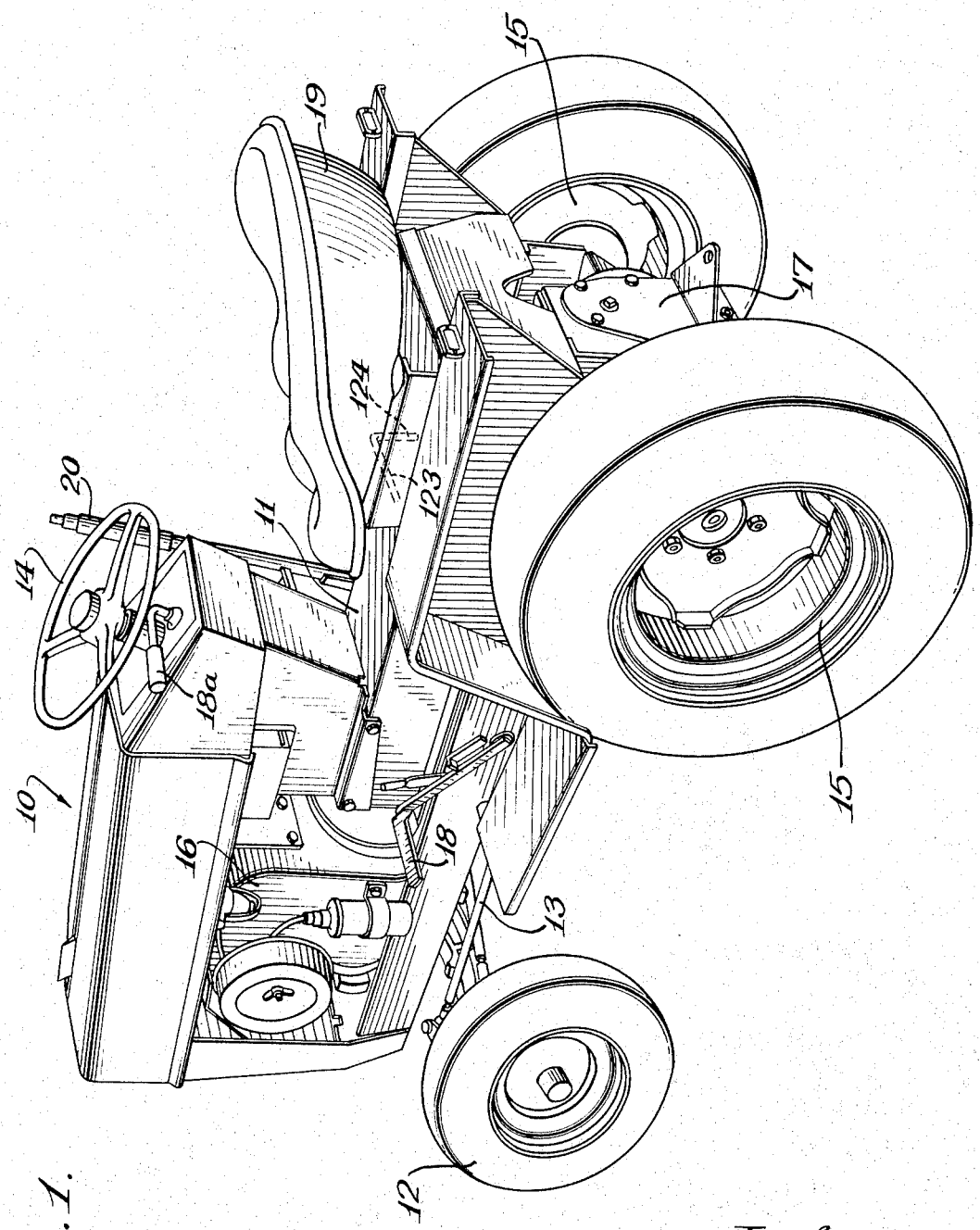
FIGURE 1 is a perspective view of a tractor vehicle of the type adapted for incorporating the proposed invention therein.

Reference being made now to the drawings hereof it will be seen that the proposed valving mechanism is depicted incorporated in a tractor vehicle, indicated generally by the reference numeral 10, including as components thereof a frame 11, front mounted steerable wheels 12 (one only of which is shown) operable through a linkage mechanism indicated generally at 13 and interconnected with an operator controlled steering wheel 14. A pair of rear drive or traction wheels 15, 15 suitably supporting the frame by means not shown are operatively interconnected to one another and to the tractor motive power or engine 16 by a final differential drive unit, indicated generally at 17 and of well known construction, while a brake pedal 18 interconnects by suitable linkage with braking means for braking the rear wheels 15, 15. A control handle 18a may interconnect by suitable linkage (not shown) with a tiltable swash plate component of the hydrostatic transmission to provide speed as well as direction of motion control as is well understood. A suitable seat such as shown at 19 may be provided, as well as a control lever 20 adapted for connection by suitable linkage mechanism (not shown) for operating implement hitching mechanism that may optionally be mounted on the vehicle. However, inasmuch as many of the foregoing components form no particular cooperative function with relation to the proposed invention further description or illustration of the specific construction thereof is believed unnecessary to a proper understanding of the invention.

The engine 16 may be operatively connected by well known driving means (not shown) to a driveshaft 21 that extends into a hydrostatic transmission unit, indicated generally by reference numeral 22 (FIGS. 2 and 3), suitably supportably carried by the vehicle frame by means not shown. The transmission unit will be seen to comprise a housing 23 and a cover plate casing or flange member 24 detachably secured thereto and aligned therewith by any suitable means such as the bolts 25 and aligning pins 26. The driveshaft 21 which preferably extends through the transmission may have the oppositely extending end thereof adapted for connection by suitable means to a power take-off device (not shown) such as is occasionally fitted to such vehicles.

Driveshaft 21 is journalled at one end in a bearing means 27 disposed in a bearing cover plate 28 affixed to the flange or cover plate 24 by suitable means such as the fastening bolts 29, with the opposite end of the shaft being journalled by a bearing 30 mounted in housing 23, while an intermediate portion of said shaft may be journalled as shown by a bearing 31 mounted in cover plate 24. Bearing 31 may also provide pilot support for a valve or port plate 32 which is constrained against rotation about shaft 21 by a pin 33 mounted in cover plate 24. A cylinder block or barrel member 34 mounted by splines 35 on shaft 21 is constrained for rotation therewith, and said barrel member as fashioned provides a plurality of axially extending cylinders such as 36 each of which is adapted to reciprocally receive a piston 37 therein, while the outer ends of said pistons are suitably mounted by ball and socket means 38 in a slipper member 39 covered with a slipper retainer 40, and said slipper member, in turn, is disposed in a sliding contact and abutting relation with a swash plate member 41.

Swash plate 41 is mounted on trunnion shafts such as 42, 42a and constrained for rotation therewith by suitable means such as the pins 43. The trunnion shafts in turn, are journalled at 44, 44a in housing 23, and snap-rings 45, 45a, positioned over outwardly extending end portions of said trunnion shafts in well known fashion, serve to limit axial displacement of these shafts. Suitable liquid seals, such as indicated at 46, may be provided one on each of said trunnion shafts to limit flow of fluid therealong as it well understood.

An enlarged diameter portion 21a, of shaft 21, may function to provide a shoulder for receiving a washer-like member 47 that abuttingly seats one end of a spring 48 whose opposite end seats against a washer-like member 49 that, in turn, abuts a snap-ring 50 disposed in an annular recess in a bore 51 provided in barrel member 34, and the reaction of said spring serves to maintain barrel member 34, valve plate 32 and cover plate 24 in closely abutting relation in a manner well understood for such devices. The foregoing may be said to comprise the hydraulic drive pump component, indicated as "P," of the hydrostatic transmission unit.

Also disposed within housing 23 and cover plate 24 and fashioned generally as hereinafter noted is the hydraulic motor component of the transmission unit. A shaft 52 having one end thereof extending outwardly through housing 23 is journalled by a bearing 53 mounted in the housing, while an opposite end of the latter shaft is journalled by a bearing 54 mounted in a recess in cover plate 24. Bearing 54 may also provide pilot support for a valve or port plate 55 which is constrained against rotation about shaft 52 by a pin 56 mounted in cover plate 24. A cylinder block or barrel member 75 mounted by splines 58 on shaft 52 is constrained for rotation therewith and, as fashioned, provides a plurality of axially extending cylinders such as 59 each of which is adapted to reciprocally receive a piston 60 therein, while the outer ends of said pistons are suitably mounted by ball and socket means 61 in a slipper member 62 covered with a slipper retainer 63, and said slipper member, in turn, is disposed in a sliding contact and abutting relation with an inclined swash plate member 64 encircling shaft 52, which swash plate is fixedly supported by housing 23 by suitable means not shown. An enlarged diameter portion 52a, of shaft 52, may function to provide a shoulder for receiving a washer-like member 65 that abuttingly seats one end of a spring 66 whose opposite end seats against a washer-like member 67 that, in turn, abuts a snap-ring 68 disposed in an annular recess in a bore 69 provided in barrel member 57, and the reaction of said spring serves to maintain barrel member 57, valve plate 55 and cover plate 24 in closely abutting relation in a manner well understood for such devices. The immediately preceeding described component may be said to comprise the hydraulic motor component indicated as "M" of the hydrostatic transmission unit, and the outwardly extending end of shaft 52 thereof is adapted for operative drive connection with the differential rear wheel drive unit 17 by suitable means (not shown).

Suitable mechanism, such as shown in copending U.S. patent application Ser. No. 532,256, may be provided for interconnection between control handle 18a and swash plate 41 for controlling operation thereof as is well known, but since these components form no particular part of the present invention the details thereof are not illustrated or described herein.

Reference is now made to FIGURES 2, 3, 4 and 5 for a more detailed description of the cover plate casing or flange 24. An inlet port 70 in the lower portion thereof opens into a vertical passage 71 that connects with a filter port opening 72 while another filter port opening 73 spaced thereabove opens into a vertical passage 74 that opens into a charge pump port opening 75 and another pump port opening 76 spaced above the latter port 75 opens into a vertical passage 77. A horizontal chamber 78 and a horizontal passage 79 also open into vertical passage 77 while passage 79 additionally opens into a chamber 80 which opens into a recess 81 in one face of said cover plate casing.

The cover plate casing is also fashioned to provide passages therethrough communicatively interconnecting the pump and motor components. A pair of vertical bores 82, 82a transversely spaced in said casing interconnect with chamber 78 and open into the respective chambers 83, 83a, which, in turn, connect with vertical passages 84, 84a and with flared recesses 85, 85a that open into kidney-shaped ports 86, 86a, while said vertical passages extend to connect with another pair of flared recesses 87, 87a that open into another pair of kidney-shaped ports 88, 88a and then said passages open into a lower surface of casing 24 where suitable means such as the plugs 89, 89a may be used to close the open ends thereof. It will be understood the ports 86, 86a and 88, 88a are disposed in cooperating and communicative alignment with corresponding kidney-shaped ports such as 32a, 32b and 55a, 55b (FIG. 6) fashioned in the port plates 32 and 55 of the respective pump and motor units of the transmission, but since the use of kidney-shaped ports in valve or port plates communicating with ports opening into cylinders of the pump and motor units of hydrostatic transmissions is so well known it was felt no useful purpose would be served by illustrating and describing in detail the construction of such elements herein.

In FIGURE 6 there is illustrated a schematic representation of the hydraulic circuit involved in the present hydrostatic transmission, and referring thereto it will be seen that a reservoir 90 containing a source of fluid is connected by passages 71 and 72 with a conventional filter unit 91 mounted by suitable means (not shown) on casing 24. The outlet of said filter connects by way of opening 73 and passage 74 with inlet port opening 75 of a hydraulic charge or fluid make-up pump 92. Charge pump 92, which may be of conventional construction such, for instance, as any one of the well known internal gear or gear within a gear type units now available on the commercial markets, may be suitably driven by the shaft 21 and may conveniently be supportably carried by the bearing cover plate 28 as seen in FIGURE 3. The outlet or discharge of said charge-pump opens into the port opening 76 which connects by passage 77 with chamber 78 that, in turn, interconnects with valve units 93, 93a thence, through the latter valve units and by way of passages 84, 84a, with the kidney-shaped ports 86, 86a and 88, 88a. These kidney-shaped ports are in fluid communication with the kidney-shaped ports 32a, 32b and 55a, 55b of the respective valve plates 32 and 55 and the latter plate ports, in turn, are in fluid communication with ports 94, 94a and 95, 95a which open into the cylinders 36 and 57 of the respective pump and motor units. The hydraulic circuit interconnecting the pump unit "P" with the motor unit "M" is commonly termed the hydrostatic loop of a hydrostatic transmission.

A conventional check valve 96 disposed in chamber 80 provides a form of pressure regulating as well as lubricating means since it connects through passage 79 with the output of charge pump 92 and when the pressure in this circuit rises said check valve opens to admit excess fluid to the interior of pump unit "P" and, by way of connecting passage 97, to motor unit "M" to provide lubrication for said pump and motor units. Drainage of fluid from said motor unit may be effected through an outlet 98 in housing 23 and conduit 99 to reservoir 90.

Now in accordance with the more specific teachings of the present invention reference is made to the valve units indicated generally by reference numerals 93, 93a, which it will be seen function to accomplish the objects hereof. However, since these valve units are identical in construction a detailed description of only one thereof need be included herein.

Each valve unit includes a valve body 100 with external threads 101 thereon for threadably fitting the valve into a complementally threaded bore 102 in cover plate casing 24. A central bore 103 in said body slidably accommodates an actuator or pin member 104 having an enlarged head 105 on the inner end thereof. The bore 103 opens into an enlarged bore portion 106 which connects with an upper transverse bore 107 and proximate the junction of the large and small bore portions there is formed a bevelled shoulder 108 that provides an abutment or stop for the enlarged head 105 of said pin. An annular recess or groove 109 in pin 104 is adapted to accommodate a fluid seal 110, and a back-up ring 111 of suitable material such as "Teflon" or the like. At the opposite end edge of the enlarged bore 106 there is fashioned a bevelled edge 112, and the juncture thereof with said bore functions to seatingly receive a ball check 113 normally retained in position thereagainst by a spring 114 the opposite end of which seats in a cup-like retainer 115. The inner end edge of said cup retainer is rolled over as shown at 116 and seats on a snap-wire ring member 117 disposed in an annular groove 118 in the body member 100 in a further enlarged bore portion 119 of said body member. An additional or lower transverse bore 120 opens into vertical bore 119. In order to simplify description corresponding elements of the second valve are designated with the same reference numerals plus the suffix "a" thereto. With the valve units 93, 93a threaded into position in cover plate casing 24 the upper transverse bores 107, 107a are disposed for fluid communication with the horizontal chamber 78 while the lower transverse bores 120, 120a are disposed for communication with the respective chambers 83, 83a.

A bracket member 121, affixed by any suitable fastening means such as the bolts 122 to the frame member 11 of the vehicle, pivotally supports a rod 123 the outer end of which is overturned to provide a handle 124, and constrained for rotation with said rod is a cam member 125 having a camming surface 126, contoured as illustrated and adapted to engage the valve pins 104, 104a upon rotation of handle 124, and another surface 127 thereon is fashioned to permit said valve pins to be raised, as seen in FIGURE 6, with the valves in their normal operating positions. It will readily be seen that with handle 124 upwardly turned cam surface 126 engages pins 104, 104a to effect a downward movement thereof, while in the downwardly turned position of the handle the pins 104, 104a are permitted to be raised into abutment with their respective stops 108, 108a.

In FIGURES 7 and 8 there is illustrated a modified form of mechanism for mechanically controlling operation of valve units 93, 93a. In this arrangement bracket 121, mounted on frame 11 by fastening means such as the bolts 122, pivotally supports rod 123 having handle 124 on the outer end thereof. A leaf spring member 128 has a loop 129 formed therein that wraps around rod 123 and is constrained for rotation therewith by suitable means such as the pin 130, and an outwardly extending portion 131 of the spring is disposed for contacting engagement with the pins 104, 104a when handle 124 is moved downwardly from a normally raised position. A grommet member 132, of suitable resilient material such as rubber or the like, supportably and frictionally accommodates the rod 123 therethrough. An L-shaped clip member 133 is pivotally mounted on frame 11 by suitable means comprising a pin 134 and a "Belleville" type spring washer 135 frictionally disposed between said clip and the supporting frame is adapted to provide frictional resistance to movement and also minimize rattling. The clip is so disposed that when handle 124 is moved to the down position said clip may be rotated to abut said handle and act as a stop to retain the handle thus positioned. It will be noted that in this modified version of the external operating mechanism the handle is moved downwardly to actuate the valves whereas in the previously described camming device the handle was raised to actuate the valves. It will be appreciated however, that both mechanisms could be identically arranged without deviating from any of the inventive concepts of the present invention.

*Operation*

Normally upon rotation of shaft 21 by the engine 16 hydraulic fluid is circulated in the hydrostatic loop between the drive pump "P" and motor "M" to transmit torque to the traction wheels according to the selected transmission ratio as evidenced by the position of the swash plate 41 in said pump. During this time the fluid pressure in the hydrostatic loop will be effective to assist springs 114, 114a in holding ball checks 113, 113a seated. Although this hydrostatic loop is basically a closed circuit there will be fluid leakage through the pump and motor units and as a consequence the pressure in the return side of the loop occasionally falls below that of the pressure in the charge or make-up pump circuit. When this occurs one of the valve units 93, 93a (the one connected to the return side of the circuit at the time) is opened by the pressure of the fluid in the charge pump circuit and the hydrostatic loop is then charged with a quantity of make-up fluid so as to permit a build-up of pressure therein sufficient to close the associated one of said valves. It will be appreciated that when the direction of rotation is reversed, as by operation of the pump swash plate, the other one of said valves will then be connected with the return side of the hydrostatic loop but the action of the valve therein will be similar to that previously described in order to effect a charging of the system.

Now when it is desired to by-pass fluid from one side of the hydrostatic loop to the other thereof, and thereby prevent the transmission of power between said pump and motor units such as when the vehicle is being pushed or towed, the handle 124 is rotated. This causes the actuator member attached thereto (the cam 125 in one instance and the leaf spring 128 in the other instance) to engage the actuator pins 104, 104a of valve units 93, 93a which thereupon contact the ball checks 113, 113a to force the latter off their seats thereby establishing fluid communication between the transverse bores 120, 120a and the interconnecting chamber 78. At this time free fluid communication is established between kidney ports 86 and 86a by way of passages 84, 84a, chambers 83, 83a and interconnecting chamber 78 whereupon fluid is recirculated around the pump circuit and no torque is delivered by the motor "M" to the vehicle's traction wheels which then are available to free wheel. Upon completion of the operation requiring a free wheeling position the handle 124 is rotated to its initial operating position whereupon valves 93, 93a are then closed by the action of springs 114, 114a, but aided on occasion by the fluid pressure in the hydrostatic loop.

It will now be seen that the proposed invention provides a novel combination valving means that is readily operable to provide by-pass of fluid between opposite sides of a hydrostatic loop when desired, and additionally is operative to effect a charging or fluid make-up of said loop with fluid as required. It will be understood that changes may be made in the construction hereof without departing from the spirit of the invention or the scope thereof as defined in the appended claims.

What is claimed is:

1. In a vehicle having an engine and traction wheels with a hydraulic transmission operatively connected therebetween including a pump and motor, first conduit means connecting the pump outlet with the motor inlet and second conduit means connecting the motor outlet with the pump inlet so that the pump supplies fluid under pressure to drive the motor, and a variable angle swash plate mechanism in the pump operable for varying the transmission ratio of the transmission and for controlling direction of fluid flow between pump and motor according to desired vehicle movement, and a fluid charge pump driven by the engine and communicatively connected to a fluid source, the combination therewith of, valving means communicatively interconnectable between said charge pump and the first and second conduit means interconnecting said pump and motor and operable in one position for porting fluid flow from said charge pump selectively to the first and second of said conduit means, and in another position for by-passing fluid between the said first and second conduit means.

2. The invention according to claim 1 and further characterized in that said valving means includes a pair of valve devices communicatively connected one with each of said conduit means and with said charge pump and normally positioned closed to restrict fluid flow from said charge pump therethrough to said conduit means but operable upon a decrease in pressure in either one of said conduit means to selectively open the valve connected to the conduit means with the decreased pressure to admit charge fluid thereinto from said charge pump, and further including means operable for actuating said valve devices to permit the by-pass of fluid between the said first and second conduit means.

3. The invention according to claim 2 and further characterized in that each of said valving devices includes a valve element and resilient means normally maintaining said element seated for restricting the passage of fluid therethrough and between said charge pump and said conduit means.

4. The invention according to claim 3 and further characterized in that said valve devices are so constructed and arranged that the fluid pressure in said first and second conduit means is normally effective for aiding the resilient means thereof in maintaining the valve elements seated and restricting the passage of fluid therethrough.

5. The invention according to claim 3 but further characterized in that each of said valve devices includes an externally outwardly projecting actuator member slidably movable for engaging and displacing a respective valve element from a normally seated and closed position to an open fluid by-pass position, and further in that the means for actuating said valve devices includes a pivotally mounted cam member having a cam surface thereon engageable upon rotation of the cam with both said outwardly projecting actuator members.

6. The invention according to claim 3 but further characterized in that each of said valve devices includes an externally outwardly projecting actuator member slidably movable for engaging and displacing a respective valve element from a normally seated and closed position to an open fluid by-pass position, and further in that the means for actuating said valve devices includes a pivotally mounted resilient member engageable upon rotation of the latter member with both said outwardly projecting actuator members.

7. The invention according to claim 6 and further characterized in that the resilient member thereof comprises a leaf spring affixed to a pivotally mounted member for rotation therewith with said spring of sufficient width to simultaneously engage both said outwardly projecting actuator members.

8. The invention according to claim 3 but further characterized in that each of said valve elements is fashioned as a ball check member slidably mounted in a centrally disposed bore in a respective valve device and engageable in a closed position with a seat formed as a shoulder in the respective bore.

9. In a vehicle hydraulic drive system, in combination, a variable displacement pump having an inlet and outlet therein, a fixed displacement motor having an inlet and outlet therein, a casing mounting said pump and motor therein, a flange cover plate detachably affixed to said casing, means formed in said cover plate providing a first conduit means communicatively connecting the pump outlet with the motor inlet and a second conduit means communicatively connecting the motor outlet with the pump inlet so that the pump supplies fluid under pressure to drive the motor, means for varying the displacement of the pump and the direction of fluid flow between the pump and motor, an engine for driving the pump, a fluid source, a fluid charge pump driven by said engine, a pair of fluid control valves mounted in said cover plate, means providing fluid passages fashioned in said cover plate communicatively interconnecting said valves with said charge pump and with said first and second conduit means, said control valves including resilient means therein normally urging said valves to a closed position restricting the passage of fluid therethrough from said charge pump but operable responsive to a decrease in pressure in one of said conduit means to selectively open the valve associated with the conduit means experiencing the decreased pressure to admit charge fluid thereinto from said charge pump, and means disposed externally of said valves and operable for actuating said valves to an open position to permit the by-pass of fluid therethrough from one to the other of said first and second conduit means.

10. The invention according to claim 9 but further characterized in that the means operable for activating said valves is arranged for simultaneous actuation of said valves, and further in that said valves are so disposed and arranged that when they are in a closed position fluid communication therethrough from one of said conduit means to the other thereof is prohibited while fluid communication between said valves and said charge pump is unrestricted but when both valves are open fluid communication is freely established between the two conduit means.

No references cited.

EDGAR W. GEOGHEGAN, *Primary Examiner.*